Figure 1:
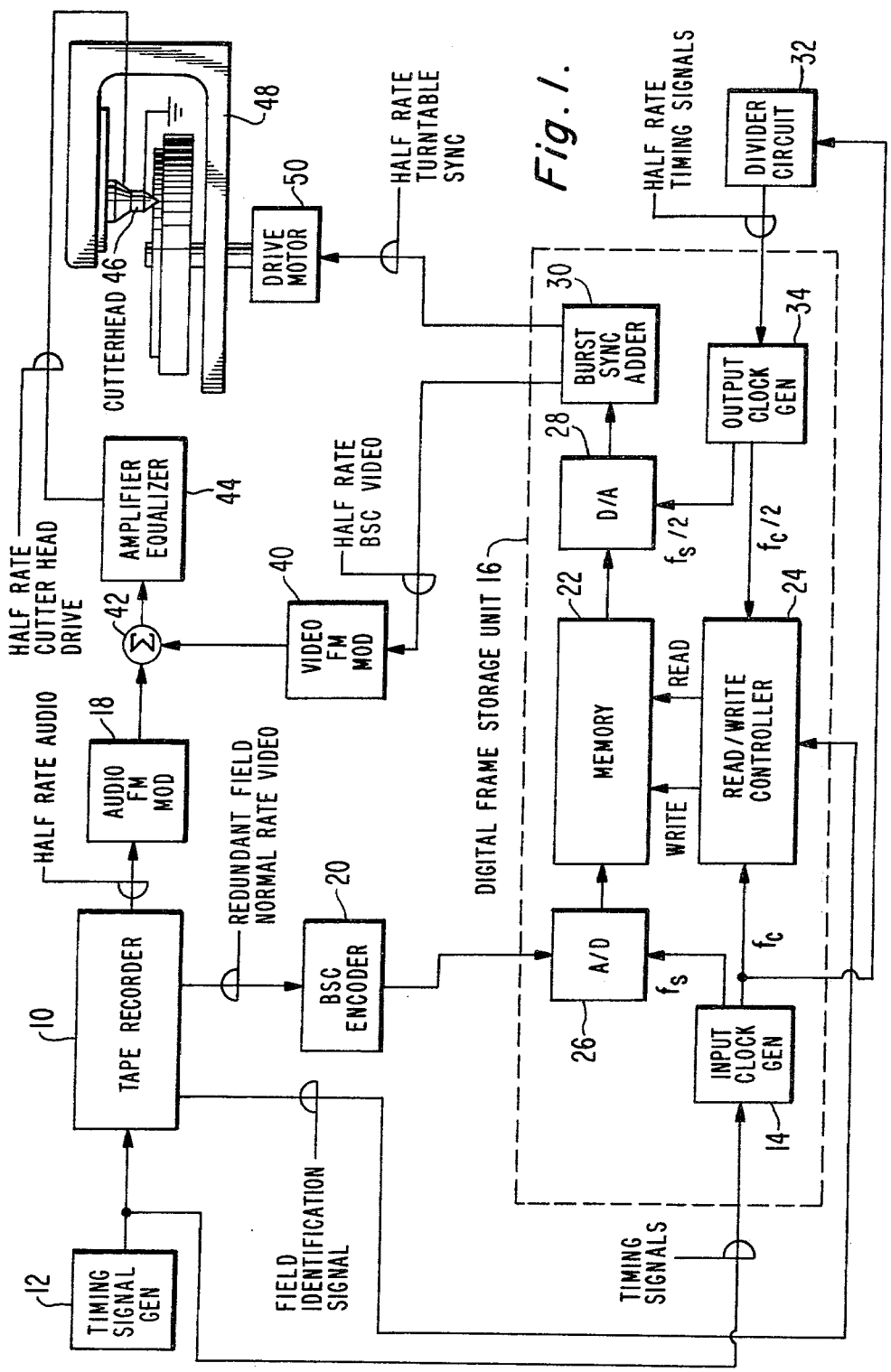

United States Patent [19]

Ross

[11] 4,277,796
[45] Jul. 7, 1981

[54] SLOW DOWN COLOR PROCESSOR FOR VIDEO DISC MASTERING USING A SPECIAL MODE VTR

[75] Inventor: Michael D. Ross, Somerdale, N.J.

[73] Assignee: RCA Corporation, New York, N.Y.

[21] Appl. No.: 87,452

[22] Filed: Oct. 22, 1979

[51] Int. Cl.³ .................... H04N 5/795; G11B 11/00; G11B 19/28

[52] U.S. Cl. .................................. 358/8; 358/128.6; 360/10; 269/60; 269/61; 269/84

[58] Field of Search .................. 179/15.55 T, 100.1 B, 179/100.1 G, 100.4 C, 100.41 P, 100.15, 100.4 E; 358/4, 8, 17, 19, 127–128.6, 133–135, 141–143, 148, 160; 360/8–11, 33, 35, 36, 70, 77–78, 73, DIG. 1

[56] References Cited

U.S. PATENT DOCUMENTS

| | | |
|---|---|---|
| 3,909,839 | 9/1975 | Inaba et al. ............................ 358/8 |
| 4,018,990 | 4/1977 | Long et al. ............................ 358/8 |
| 4,035,590 | 7/1977 | Halter ........................ 179/100.41 P |
| 4,044,379 | 8/1977 | Halter ........................ 179/100.41 P |
| 4,060,831 | 11/1979 | Halter .......................... 179/100.4 C |
| 4,080,626 | 3/1978 | Hurst et al. ......................... 358/160 |
| 4,133,009 | 1/1979 | Kittler ..................................... 360/9 |
| 4,163,994 | 8/1979 | Sakamoto et al. .................... 360/70 |
| 4,165,521 | 8/1979 | Watanabe ............................. 360/10 |

Primary Examiner—Raymond F. Cardillo, Jr.
Attorney, Agent, or Firm—Eugene M. Whitacre; Joseph S. Tripoli; Richard G. Coalter

[57] ABSTRACT

Selected fields of a redundant field slow motion video tape reproduced video signal are stored in a memory at a given clock rate and recovered at a lower clock rate that is inversely proportional to the number of times each field is repeated so as to produce a non-redundant video signal of reduced bandwidth. An audio signal is simultaneously reproduced from the tape at a rate less than that at which it was originally recorded and combined with the recovered video signal to produce a composite audio-video signal of reduced bandwidth possessing the full informational content of the original audio and video signals. The composite signal is suitable for application to the cutterhead of a video disc mastering lathe operating at reduced turntable speed whereby full bandwidth master recordings may be made with a cutterhead of lesser bandwidth.

11 Claims, 2 Drawing Figures

SLOW DOWN COLOR PROCESSOR FOR VIDEO DISC MASTERING USING A SPECIAL MODE VTR

This invention relates to video signal processors and particularly to video signal slow down processors of the kind for producing audio and video signals at less than "real time" rates which may be advantageously used in electromechanical video disc mastering applications.

Unique problems are presented in electromechanical mastering of video disc records because the very high information density involved requires operation of the disc cutterhead at bandwidths far beyond those encountered is conventional audio disc mastering. As explained in U.S. Pat. Nos. 4,044,379 and 4,060,831, which issued to J. B. Halter on Aug. 23 and Nov. 29, 1977, respectfully, there are several ways one may improve cutterhead bandwidth to minimize the mastering problem. One may, for example, scale down the cutterhead size so as to increase its principal resonant frequency. Further improvement may be obtained by employing a metal master cut with an unheated stylus, by selecting a cutterhead architecture such that all external surfaces of the pedestal, the piezoelectric transducer and the stylus are disposed anti-parallel to each other and by preconditioning the signal to be recorded with an equalizer circuit such that the frequency response characteristic of the equalizer circuit is complementary to the frequency response characteristic of the cutterhead.

Where the above mentioned cutterhead improvements are not adequate to achieve the desired recorded bandwidth one may nevertheless produce a full bandwidth master recording by cutting the disc at a rate less than "real time". Halter explains that to do this the signal to be recorded must be slowed down such that the highest significant frequency component is shifted to a frequency lower than the principal resonant frequency of the cutterhead prior to recording and the disc master recording turntable must be rotated at a correspondingly reduced speed. Such a procedure will hereinafter be referred to as "down speed" recording with X2D meaning "times two down speed" (half rate) recording, X3D meaning "times three down speed" (one third rate) recording, etc.

Slowing down a signal to reduce its bandwidth for down speed mastering is not a simple task and is complicated by the need to maintain correct color field sequencing in the video signal and by the fact that the audio signal bandwidth must also be reduced proportionally. This latter factor rules out the possibility of using conventional skip line or skip field video bandwidth reduction techniques as well as the fact that with such techniques one half (or more) of all of video information processed is usually lost.

As an example, consider the video signal bandwidth reduction arrangement shown in U.S. Pat. No. 4,133,009 entitled "Color Video Tape Recording/Playback System" which issued Jan. 2, 1979, to W. Kitter et al. In the Kitter, et al. technique, every Nth line or field is entered into an electronic signal storage device at clock frequency during a period corresponding to the line scan or field scan period. The lines or fields intermediate to the Nth line or field are skipped and the stored information is clocked out at 1/Nth clock frequency and then recorded on a magnetic tape recorder. Since the fields are clocked out of memory at less than the rate they were clocked in, the video signal bandwidth is reduced in accordance with the ratio, N, of the clock signals. On playback the recorded signals are clocked back into the memory and read out at a high clock rate to restore the bandwidth of the signal to its original value.

Kitter, et al. acknowledge that picture quality is degraded by the skip line or skip field technique (since the skipped video signals are not recorded and thus not recoverable on playback) but express the view that the quality is sufficient for what they refer to as "domestic" requirements (meaning home recording purposes). A bandwidth reduction technique in which half or more of the video information is lost (i.e., the skipped lines or fields) is not believed to be adequate, however, for video disc mastering purposes where the record buyer may well expect that the video disc he purchases will provide a picture quality comparable with that obtainable from over-the-air broadcast television.

A further problem with the skip line or slip field technique of video signal bandwidth reduction is that it is not applicable to audio signals. For the purposes of Kitter, et al a reduction in audio bandwidth was not necessary, but in down speed video disc mastering it is essential.

One solution to all of the above problems would be to modify a conventional video tape recorder in such a manner so as to operate with reduced tape-head velocity on playback for both the audio and the video heads. Insofar as is known, however, no such video recorders are commercially available and the modification which would be required to a conventional commercially available recorder is not simple owing, for example to the complex nature of the signals, the changes in equalization required, the difficulty of accurately tracking the recorded signal path under different dynamic conditions and other problems. A further difficulty is that if a conventional video tape recorder were so modified the changes might limit the utility of the recorder to "dedicated" or specialized applications.

A slow down processor in accordance with the present invention includes tape recorder means responsive in a playback mode for reproducing a redundant field video signal, each field being produced at a rate corresponding to the rate at which it was originally recorded, and responsive also in the playback mode for reproducing an audio signal from a tape at a rate less than the original recording rate of the audio signal. Memory control means are provided for writing selected ones of the redundant fields into a memory at a given clock rate and reading the selected fields out of the memory at a lower clock rate, the clock rate ratio being predetermined in accordance with the level of redundancy of the video signals. The audio and video signals are then combined to provide the composite signal.

The composite signal, being of lesser bandwidth yet possessing the full informational content of the original audio and video signals, may be applied to the cutterhead of a video disc mastering lathe operating at reduced turntable velocity whereby full bandwidth master recordings may be made with a cutterhead of lesser bandwidth without loss of any audio or video informational content.

In accordance with a further aspect of the invention the redundant field video signal includes a luminance component occupying a first band of frequencies and a chrominance component occupying a second band of frequencies. An encoder is provided for relocating the chrominance component of the video signal to a predetermined location within the first band of frequencies, the encoder being interposed between the tape recorder means and the memory means thereby providing a bandwidth alteration of the redundant field video signal prior to storage of the selected fields in the memory.

Figure 2:
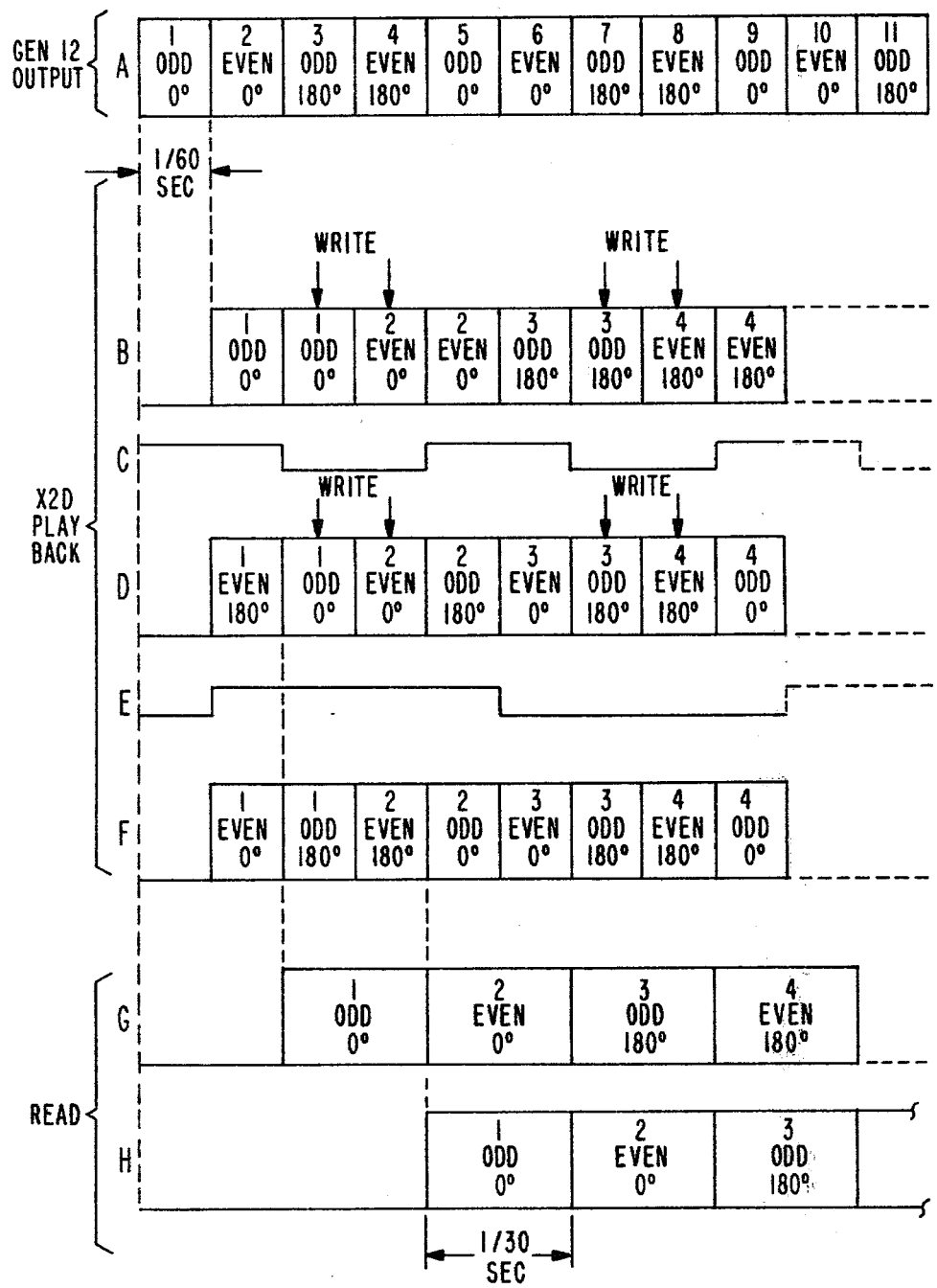

The above and further aspects of the invention are presented in detail in the following description and illustrated in the accompanying drawing, in which:

FIG. 1 is a block diagram of an X2D video disc mastering system including a slow down processor embodying the invention; and FIG. 2 is a signal timing diagram illustrating certain aspects of operation of the system of FIG. 1.

The system of FIG. 1 illustrates application of the invention to "half rate" or X2D (times two down speed) video disc mastering of buried subcarrier (BSC) modified NTSC format program material. Half rate recording speed is preferred because it represents the highest down speed recording rate attainable utilizing the selective storage redundant field principle of the invention and it is within the capabilities of electromechanical cutterheads having the previously mentioned improvements proposed by Halter. The invention is readily adaptable, however, to other down speed rates (X3D, X4D, etc.) for use with cutterheads of lesser bandwidth. Although more time is required for cutting at reates less than X2D there is, nevertheless, an advantage to be gained at the lower rates in that field sequences are produced of such a character that monitoring of the recording process may be simplified. This distinction between X2D and slower rates (X3D, X4D, etc.,) will be discussed in detail subsequently as well as application of the invention for processing other video formats (PAL, SECAM, etc.).

In FIG. 1 tape recorder 10 is a slow motion video tape recorder which is preferably of the non-segmented helical scan type such as the Ampex Corporation model VPR-1 Video Production Recorder. The video pickup head in the VPR-1 is servo controlled for movement in two planes within the video scanning drum. This feature, referred to as automatic scan tracking (AST), enables the video head to repeatedly scan a given field recorded on the tape before advancing to the next field. Still frame video may thus be produced by stopping the tape entirely and repeatedly scanning the same field. It is also possible for the operator to manually control the movement of the tape from one frame to the next, forward or backward, on command. Such a procedure is known as manual "jogging".

For slow motion, the tape speed of the VPR-1 is reduced in proportion to the number of times each frame is scanned and the video head velocity is maintained at its normal value so that the redundant (repeated) fields thus produced occur at the normal NTSC field rate (about 60 fields per second). Since the accompanying audio signal is recorded longitudinally on one edge of the tape and reproduced by a stationary head, the audio signal rate (and thus its bandwidth) is reduced in proportion to the reduction in tape speed. Another suitable tape recorder is the model BVH-1000 VTR manufactured by Sony Corporation which features a dynamic tracking option similar to the Ampex AST system discussed above).

Timing signals for tape recorder 10 are provided by timing signal generator 12 which also supplies timing signals to the input clock generator 14 of digital frame storage unit 16 (outlined in phantom) for coordinatng the production of redundant field video signals in tape recorder 10 with storage of selected ones of the redundant fields in the storage unit. A generator suitable for producing NTSC format standard video timing signals is the Tektronix Model 146 NTSC Test Signal Generator. (For mastering in other formats such as PAL or SECAM an appropriate generator should be used).

The audio output of tape recorder 10 is applied to the input of audio FM modulator 18 for conversion to an FM signal having a center frequency and a peak deviation equal to one half of their "fullrate" values. The reason for this is that both those parameters double upon playback of records derived from the master since the replicas will be rotated at twice the speed the master was cut (for X2D mastering). Illustratively, it will be assumed that mastering is to be done in the well known buried subcarrier (BSC) modified NTSC format (see, for example, U.S. Pat. No. 3,872,498 which issued Mar. 18, 1975 to D. H. Pritchard) with an audio FM carrier center frequency of about 716 KHz and a peak deviation of about 50 KHz (per U.S. Pat. No. 3,969,756 Palmer et al.). Thus for X2D mastering in this format FM modulator 18 should have a center frequency of (716/2) KHz and a peak deviation of (50/2) KHz.

Errors or drift of the center frequency of FM modulator 18 are multiplied by the ratio of the playback turntable speed divided by that of the mastering turntable (in this case X2). For this reason it is preferable that modulator 18 (and also the video FM modulator to be described subsequently) feature high center frequency stability.

The redundant field normal rate (60 fields/sec) video signal produced by tape recorder 10 is encoded in buried subcarrier format prior to selective storage in digital frame storage unit 16 by means of buried subcarrier (BSC) encoder 20. Desirably, encoder 20 is of the type described in the aforementioned Pritchard patent in which chrominance information is represented by a color subcarrier of the general form employed in the well known NTSC format but is buried in a lower portion of the video band rather than being located in the high end of the luminance signal band. An illustrative subcarrier frequency choice is in the vicinity of 1.53 MHz with color subcarrier sidebands extending ±500 KHz thereabout and with the luminance signal band extending well above the highest color subcarrier frequency (to 3 MHz, for example).

There are a number of important advantages in interposing encoder 20 between the output of recorder 10 and the input of storage unit 16 rather than performing the BSC format conversion at a later point in the video processing chain. One advantage is that one need not alter or modify any parameter of encoder 20 when changing from one down speed rate to another whereas if encoding were done at the output of storage unit 16 changes would be necessary. The reason is that the output spectrum of recorder 10 is independent of its speed (only the number of frames that are repeated is changed) but the output spectrum of storage unit 16 changes at different down speed rates since at lower down speed rates information is clocked out of memory at lower rates. Put another way, the video bandwidth of recorder 10 is constant at any down speed rate whereas the bandwidth of the video signal produced by storage unit 16 is inversely proportioned to the down speed rate (at X2D the bandwidth is ½, at X3D it is ⅓, etc).

A second advantage of providing bandwidth alteration of the redundant field video signal prior to storage of selected ones of the fields relates to the manner of storage of the signals. Storage unit 16, as will be described in more detail subsequently, is a digital storage unit in which the video signal is sampled at a given clock frequency for conversion to binary form for storage. Conventionally the sampling rate is much higher than the Nyquist rate for the color subcarrier frequency in order to preserve color fidelity. An illustrative choice for sampling is four times the color subcarrier which in NTSC (3.58 MHz) requires sampling at over 14 MHz. Since the BSC subcarrier (1.53 MHz) is less than half the NTSC color subcarrier frequency the sampling rate for the subcarrier component is more than doubled for a given clock frequency. This higher effective color sampling rate provides improved color fidelity.

Digital frame storage unit 16 includes a memory 22 for providing temporary storage of selected fields of the redundant field (BSC encoded) video signal produced by recorder 10 and a read/write controller 24 responsive to a field identification signal supplied by recorder 10 for writing the selected fields into memory 22. The subcarrier signal from the timing signal generator 12 provides a clock rate, $f_c$, for writing the selected fields into memory 22 and for reading the selected fields out of memory 22 at a lesser clock rate (here, $f_c/2$) so as to produce a nonredundant video output signal of reduced bandwidth, the ratio (2) of the clock rates $f_c:(f_c/2)$ being predetermined in accordance with the redundancy level of the video signal. As used herein, the term "redundancy level" means the number of times each field is scanned by the video head in recorder 10 before advancing to the next field.

In more detail, storage unit 16 is similar in many respects to conventional storage units used for frame synchronization in television studio applications (see, for example U.S. Pat. Nos. 4,101,926 and 4,110,785 which issued July 18, 1978 and Aug. 10, 1978 respectively) and may be implemented by modifying a conventional frame synchronizer in accordance with the invention. A commercially available synchronizer suitable for this purpose is the model TFS-121 "Video Frame Synchronizer" sold by RCA Corporation.

Storage unit 16 comprises an analog-to-digital (A/D) converter 26 for converting the video signal to digital form for application to memory 22 and a digital-to-analog (D/A) converter 28 for reconverting the signal back to analog form. In the type TFS-121 synchronizer the A/D converter output is bit serial and a serial-in parallel-out (SIPO) buffer is used to convert the signal to a word organized form (8 bit) for storage in memory 22. A parallel-in-serial-out (PISO) buffer is then used for reconverting the memory output to serial form for D/A converter 28. A/D converter 26 receives a sampling signal $f_s$ from an output of input clock generator 14 which is synchronized with timing signals supplied by generator 12. A preferred value of $f_s$ is 4 fsc, wherein fsc is the NTSC color burst frequency. Clock generator 14 also supplies a read clock signal $f_c$ to read/write controller 24 and to the input of divider circuit 32 which divides $f_c$ by two. The resultant "half rate" timing signal is applied to the input of clock generator 34 which, in turn supplies a half rate sampling signal ($f_s/2$) to D/A converter 28 and a half rate read clock signal ($f_c/2$) to read/write controller 24.

Video timing signal (sync and burst) are not stored in the memory since they are predictable repetitive functions. Rather, they are added to the output of D/A converter 28 by means of burst sync adder 30. It is conventional practice in storing digitized video signals to reinsert timing signals which are rephased replicas of the original timing signals. Here, however, the reinserted timing signals are related to the redundancy level, N, (as previously defined) of the input video signal. Specifically, burst and sync are added to the output of D/A converter 28 at 1/Nth of their original value. For X2D mastering of BSC encoded video the burst is reinserted at a frequency of 765 KHz (1.53 MHz/2) and vertical synchronizing pulses are added at a repetition rate of about 30/sec (one half the NTSC standard field rate).

In the interest of maintaining proper interlace of the processed video signal it is desirable that each field set of the redundant field video signal supplied to the input of storage unit 16 include at least one field which is a member of a subset conforming to a predetermined broadcasting standard, such as NTSC, PAL or SECAM. It is a further feature of the invention that this set-subset relationship does not require any special video field correction circuitry for certain down speed mastering rates (e.g. X3D) and for certain other down speed mastering rates (e.g. X2D) it can be achieved by inhibiting the operation of a selected correction circuit within tape recorder 10. These features are relatively complex conceptually but may be easily understood from the following discussion of FIG. 2 which illustrates timing relationships of the system of FIG. 1.

Waveform 2A of FIG. 2 shows the field sequence of the video timing signals produced by generator 12. This sequence is invariant for all down speed mastering rates and will be recognized as being a standard NTSC sequence in which vertical sync alternates (odd-even-odd, etc.) from field-to-field and chrominance phase reverses with each odd field (1,3,5 ...). A complete color frame thus comprises a set of four fields having all possible combinations of sync and phase (e.g. odd 0°, even 0°, odd 180°, even 180°). For convenience of discussion, the fields are arbitrarily numbered 1–11 for the NTSC field sequence shown. The invention, however, may readily be applied to other broadcasting standards such as PAL (8 fields per color frame) or SECAM (12 fields per color frame).

Waveform B of FIG. 2 shows the field sequence of the video head output of recorder 10 (an Ampex VPR-1 as previously mentioned) upon playback of an NTSC recorded tape at half speed. The field rate (60/sec) is the same as that of generator A and each field recorded on the tape is scanned twice upon playback so that there are two fields one, two fields two, etc. Synchronizing circuits within recorder 10 and responsive to the output of generator 12 aligns the first field on playback (odd, 0°) with field two of the generator output (even, 0°). Since each field is scanned twice the sync-phase sequence (at the playback head output) is Odd 0°, Even 0°, Even 0°, Odd 180° etc. as shown. This, of course, is not an NTSC field sequence and would not produce an acceptable picture if monitored at the playback head output. The Ampex VPR-1 recorder, however, includes sync and chroma correction circuitry for converting the non NTSC signal of waveform B to a correct NTSC sequence shown in waveform F.

At this point it is instructive to note that in waveform F (corrected NTSC) each field set (1-1, 2-2, 3-3, etc.) does not include at least one field which is a member of a subset conforming to the NTSC broadcasting standard. One cannot, for example, pick one field from each of the four redundant sets of fields such that the four selected fields have a sequence Odd 0°, Even 0°, Odd 180°, Even 180° (standard NTSC). The significance of this is that while the normal output of recorder 10 has a correct NTSC field sequence, it is not a proper sequence for purpose of the present invention.

To arrive at a correct field sequence for storage in memory 20 it is helpful to consider how waveform F (the normal output of recorder 10) is derived from waveform B (the uncorrected video head output). This is done by means of sync and chroma correction circuits in the recorder. As shown in waveform C, circuitry within the recorder produces a sync correction signal which activates other circuitry in the associated time base correction unit of the recorder that changes even fields to odd (and vice versa) during fields 1, 2, 5, 6 and 9 of waveform A. This is signified by a high level for waveform C. As a result the first field 1 of waveform B is changed from Odd to Even, the second field 2 is changed from Even to Odd, etc. as shown in waveform D. Thus, in terms of vertical sync, waveform D is an NTSC sequence but not so in terms of its chroma phase (note also that a change in vertical sync necessarily also reverses chroma phase). This is provided for in the associated time base correction unit of the recorder by a chroma phase inverter circuit which as shown in waveform E inverts the chroma phase (signified by a high level) of waveform D during frames 2–5 of waveform A to thereby produce the NTSC sequence of waveform F.

With the above background in mind, it is apparent that although one cannot select one field of each redundant field set from waveform F such that a correct NTSC four field sequence can be formed one may select such fields from waveforms B or D with the aid of waveform C. Note that when waveform C is low (meaning no sync correction is being done in the recoder) that waveforms B and D both contain a single field (identified by arrows) in each of the four sets of redundant fields 1-1, 2-2, 3-3, 4-4 which if placed in sequence would conform to the NTSC standard. Thus, in accordance with a further aspect of the present invention, the sync correction signal which is normally used for correcting vertical sync in the recorder may be used as the field identification signal shown in FIG. 1 which identifies which fields produced by recorder 10 are to be stored in memory 20. For the example given they correspond in time to fields 3, 4, 7 and 8 of waveform A.

As mentioned, either of waveforms B or D could be supplied (via BSC encoder 20) to frame storage unit 16 for storage in memory 22. It is a feature of the invention that one need not add a cable to either the reproduce head processing circuitry or the sync correction circuitry in the recorder to obtain the desired signals. One need only inhibit the video output portion of the chroma correction circuitry mentioned previously and waveform D will appear at the output of the machine rather than waveform F. This has the further advantage of avoiding separation of the chrominance and luminance signal components as is done in conventional chroma inverter circuits andproviding a time base stabilized signal to the BSC encoder 20.

Waveform G and H of FIG. 2 illustrate options for reading the fields stored in memory 22 (the general operation of which has been previously described). As shown in waveform G one may begin readout of field 1 immediately as it is being stored. This is possible because the write clock rate is greater than the read clock rate. An alternative, as shown in waveform H, is to begin reading field 1 at the end of writing field 2. In either case the resultant signal is a contiguous series of video fields containing all the informational content of the original signal (no missing or skipped fields), having an NTSC sync and phase sequence and a buried subcarrier chrominance format and having half the bandwidth of the original video signal.

Referring again to FIG. 1, video FM modulator 40 converts the half rate BSC video output signal produced by storage unit 16 to an FM signal which is combined in summing circuit 42 with the audio FM signal produced by modulator 18 for application via amplifier equalizer 44 to the cutterhead 46 of a mastering lathe 48. Lathe 48 is equipped with a turntable drive motor 50 which is synchronized with half rate vertical sync signals obtained from burst sync adder 30 in storage unit 16. FM modulator 40 may be of conventional design but, as mentioned in the discussion of modulator 18, should have a center frequency and a peak deviation selected to be 1/Nth of the desired final values on playback of the mastered disc at normal rates wherein N is the field redundancy level as previously defined. Amplifier equalizer 44 provides drive signals to cutterhead 46 and preferably exhibits a transfer function which maximizes the cutterhead bandwidth. The previously mentioned Halter U.S. Pat. No. 4,060,831 provides details of a preferred equalizer arrangement for X2D mastering.

As previously mentioned, when operating the system of FIG. 1 at lower downspeed rates, field sequences are produced which simplify monitoring of the video signal during recording. For example, at X4D the normal output of recoder 10 comprises four fields "one" having all possible NTSC chroma phase and vertical sync combinations followed by four fields "two", etc. Thus for X4D mastering it is not necessary to inhibit the chroma inverter in recorder 10 since every redundant field set includes at least one field which is a member of a subset conforming to the NTSC field sequence.

It will further be appreciated that the selective storage redundant field principle of the present invention may readily be applied to other video standards such as PAL or SECAM taking due account of the different scanning rates (625 lines rather than 525), field rates (50 rather than 60) and chroma format (a complete color frame in PAL comprises eight fields and in SECAM twelve fields rather than four as in NTSC).

What is claimed is:

1. A slow down processor for producing a composite audio-video signal of reduced bandwidth suitable for use in mastering of video disc records at less than real time rates, said processor comprising:

tape recorder means responsive in a playback mode for producing a redundant field video signal, each field being produced at a rate corresponding to the rate at which it was originally recorded on said tape, and responsive also in said playback mode for producing an audio signal from the tape at a rate less than the original recording rate of said audio signal;

memory means for providing temporary storage of selected fields of said redundant field video signal;

memory control means responsive to a field identification signal supplied thereto for writing said selected fields into said memory means at a given clock rate proportional to a subcarrier reference signal supplied thereto and for reading and selected fields out of said memory means at a lesser clock rate so as to produce a non-redundant video output signal of reduced bandwidth, the ratio of said clock rates being predetermined in accordance with the redundancy level of said redundant field video signal; and means for combining said audio signal with said non-redundant video signal produced by said memory means to provide said composite signal.

2. A slow down processor as recited in claim 1 wherein said redundant field video signal includes a luminance component occupying a first band of frequencies and a chrominance component occupying a second band of frequencies substantially contiguous with the first and further comprising:

encoder means for relocating said chrominance component of said video signal to a predetermined location within said first band of frequencies; and wherein said encoder means is interposed between said tape recorder means and said memory means for providing a band width alteration of said redundant field video signal prior to storage of said selected fields in said memory means.

3. A slow down processor as recited in claim 1 wherein said tape recorder means is a kind including color field sequence correction circuitry operable in said playback mode for modifying the vertical synchronization and chrominance phase of said redundant field video signal to conform to a predetermined broadcasting standard and further comprising:

means for inhibiting operation of said color field sequence correction circuitry such that each field set of said redundant field video signal includes at least one field which is a member of a subset conforming to said predetermined broadcasting standard.

4. A slow down processor as recited in claim 1 further comprising:

means for deriving said field identification signal from a field sequence correction signal produced by said tape recorder means.

5. A slow down processor as recited in claim 1 further compising:

timing signal generator means for supplying a timing signal to said tape recorder means;

input clock generator means responsive also to said timing signal for generating write clock signals for said memory means;

divider means for dividing said timing signal in accordance with said redundancy level of said redundant video signal;

output clock generator means responsive to an output of said divider means for generating read clock signals for said memory means.

6. A slow down processor as recited in claim 1 further comprising:

means for producing a speed control signal having a timing component inversely proportional to said redundancy level of said redundant field video signal for application to the turntable drive system of a video disc mastering lathe.

7. A slow down processor as recited in claim 1 wherein said memory means is of a type for storing only active video information and further comprising:

burst sync adder means for inserting chrominance burst and synchronizing signals to said nonredundant video output signal of reduced bandwidth, the frequency and timing of said added signals being related to said redundancy level.

8. A slow down processor for producing a composite FM audio FM video signal of reduced bandwidth suitable for use in mastering of video disc records at 1/Nth real time rate wherein N is an integer greater than unity, said processor comprising:

slow motion magnetic tape recorder means responsive in a playback mode for producing an audio signal from a magnetic video tape, the audio reproduce head-to-tape velocity being equal to 1/Nth of its original recording value whereby the bandwidth of said audio signal is reduced by a factor 1/N, said recorder being responsive also in said playback mode for producing a redundant field video signal, the video reproduce head-to-tape velocity being equal to its original recording value whereby the bandwidth of said video signal equals its original value, each redundant set of fields including N similar fields;

digital memory means for providing temporary storage of a selected field from each said set of fields, each one of said selected fields being a member of a subset conforming in terms of field sequence and chrominance phase to a predetermined broadcasting standard;

memory control means responsive to a field identification signal supplied thereto for writing said selected fields into said memory means at a given clock rate $f_c$, and for reading said selected fields out of said memory means at a lesser clock rate equal to $f_c/N$ for producing a nonredundant video output signal of reduced bandwidth conforming in terms of field sequence and chrominance phase to said predetermined broadcasting standard; and FM modulator and combiner means responsive to said audio signal produced by said tape recorder means and said non-redundant video output signal read from said memory means for producing said composite FM audio FM video signal.

9. A slow down processor as recited in claim 8 wherein said redundant field video signal includes a luminance component occupying a first band of frequencies and a chrominance component occupying a second band of frequencies substantially contiguous with the first and further comprising:

buried subcarrier encoder means including frequency translation circuitry for relocating said chrominance component of said redundant field video signal to a predetermined location within said first band of frequencies; and wherein said buried subcarrier encoder means is interposed between said slow motion tape recorder means and said digital memory means for providing a bandwidth reduction of said redundant field video signal prior to its conversion to digital form for storage in said digital memory means.

10. A slow down processor as recited in claim 8 further comprising:

means for deriving said field identification signal from a field sequence correction signal produced by said tape recorder means.

11. A slow down processor as recited in claim 8 further comprising:

means for producing a speed control signal having a timing component inversely proportional to N for application to the turntable drive system of a video disc mastering lathe.

* * * * *